UNITED STATES PATENT OFFICE.

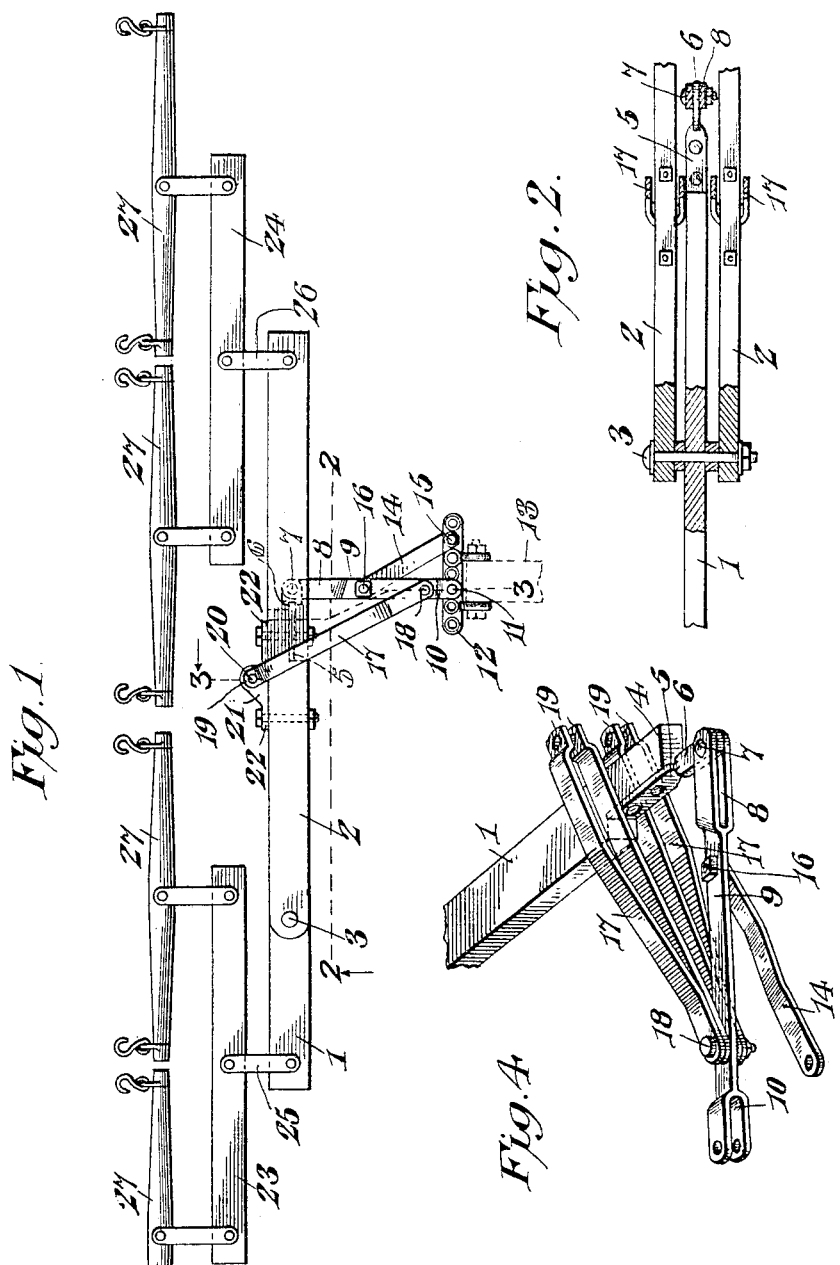

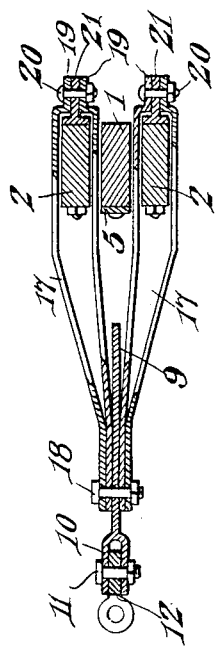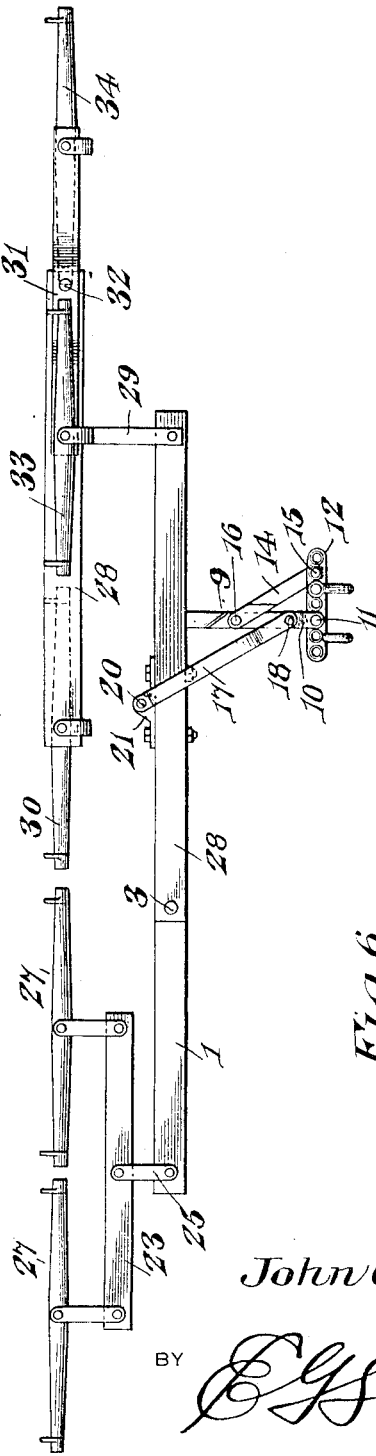

JOHN GROSS, OF CARROLL, IOWA, ASSIGNOR TO THE GROSS COMPANY, OF CARROLL, IOWA.

DRAFT-EQUALIZER.

1,120,711. Specification of Letters Patent. Patented Dec. 15, 1914.

Application filed October 18, 1913. Serial No. 795,935.

*To all whom it may concern:*

Be it known that I, JOHN GROSS, a citizen of the United States, residing at Carroll, in the county of Carroll and State of Iowa, have invented a new and useful Draft-Equalizer, of which the following is a specification.

The invention relates to improvements in draft equalizers.

The object of the present invention is to improve the construction of draft equalizers, and to provide a simple, practical and comparatively inexpensive draft equalizer of strong and durable construction, designed for use on plows and other implements and machines, and adapted to equalize the draft between four or more horses, and capable when applied to a plow or other implement of maintaining itself in approximately horizontal position when it is not subjected to a strain or pull, whereby it will be prevented from dropping to the ground and being trampled upon by the horses or other draft animals.

A further object of the invention is to provide a draft equalizer of this character adapted to afford a straight pull without any tendency to twist, and capable when applied to a plow of enabling the same to cut an even furrow and of preventing any tendency of the plow to run on its point.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction, within the scope of the claim, may be resorted to without departing from the spirit or sacrificing any of the advantages of the invention.

In the drawings: Figure 1 is a plan view of a four horse draft equalizer, constructed in accordance with this invention. Fig. 2 is a transverse sectional view, taken substantially on the line 2—2 of Fig. 1. Fig. 3 is a similar view on the line 3—3 of Fig. 1. Fig. 4 is a detail perspective view, illustrating the arrangement of the central draft bar and the angularly disposed loop-shaped links for connecting one of the levers with the main draft bar. Fig. 5 is a plan view showing the improvements applied to a five horse evener. Fig. 6 is an elevation of a portion of the same.

Like numerals of reference designate corresponding parts in all the figures of the drawings.

In the accompanying drawings in which is illustrated the preferred embodiment of the invention, the draft equalizer comprises in its construction a flexible evener composed of two overlapped levers 1 and 2 projecting, respectively, at the left and right hand sides or ends of the equalizer. The left hand lever 1 preferably consists of a single bar, while the right hand lever 2 is made up of a pair of upper and lower bars spaced apart to receive the inner over-lapped portion of the lever 1, as clearly illustrated in Fig. 2 of the drawings. The levers 1 and 2 are connected by a pivot bolt 3, piercing the inner or left hand terminals of the bars of the lever 2 and passing through the lever 1 at a point intermediate of the ends thereof. The inner end 4 of the lever 1 is recessed at the rear edge and is equipped with a plate 5, preferably made in the form of a casting and having a horizontal ear 6 projecting beyond the inner end of the plate 5 and pivoted by a bolt 7 or other suitable fastening device in a fork or bifurcation 8 of a central main draft bar 9. The central main draft bar 9 extends rearwardly from the lever 1 and is pivoted at its rear end 10 by a bolt 11, or other suitable fastening device to a clevis 12 of a plow beam 13. The rear end 10 of the main draft bar is preferably forked or bifurcated to receive the clevis within it, and the said main draft bar extends longitudinally of the beam and is maintained rigidly in such position by an angularly disposed brace 14 located at the right hand side of the main draft bar 9 and connected with the adjacent side of the clevis by a bolt 15 or other suitable fastening device. The front end of the brace 14 is secured to the main draft bar by a bolt 16 or other suitable fastening means.

The right hand lever 2 is connected with the rear portion of the main draft bar 9 by loop-shaped links 17, secured at their rear ends to the draft bar 9 by a pivot bolt 18, which is common to both of the links 17. Each link 17 consists of a pair of metallic straps or bars having their rear portions fitted together and spread apart at their front portions to form loops and to provide openings through which the bars of the lever 2 pass. The front ends of the straps or bars of each loop-shaped link 17 are provided with terminal ears 19, spaced apart and pivoted by bolts 20 or other suitable fastening devices to the projecting ears 21 of the bars of the lever 2. The metallic straps or bars of the links are angularly bent at the front edges of the bars or members of the two-bar lever 2, and the ears 19 of the said links are arranged at the upper and lower faces of the projecting ears 21, which are preferably integral with attaching plates or flanges 22, bolted or otherwise secured to the front edges of the bars of the lever 2 and preferably consisting of castings. The loop-shaped links transmit the strain of the draft or pull to the main draft bar 9, and the particular arrangement of the draft bar and the loop-shaped links together with the particular construction of the lever 2 with its spaced bars is adapted to prevent the draft equalizer from twisting and when the plow clevis is rigid with the plow beam, this structure is also capable of supporting the draft equalizer in substantially a horizontal position and of preventing the same from dropping to the ground and being trampled on by the draft animals. The clevis does not constitute any portion of the present invention, and any form of clevis may, of course, be employed. The brace 14, which is provided for the purpose of increasing the strength of the construction, may be omitted, as only a single connection with the clevis through the main draft bar is essential to the operation of the draft equalizer.

Doubletrees 23 and 24 are connected by short links 25 and 26 with the outer ends of the levers 1 and 2, and each of the doubletrees is provided with a pair of swingletrees 27. The draft equalizer illustrated in Figs 1 to 4 inclusive is designed for equalizing the draft between four horses, but the construction is adapted for equalizing the draft between a greater number of draft animals, and in Figs. 5 and 6 is illustrated a five horse draft equalizer, it being only necessary to correspondingly proportion the levers of the flexible evener and substitute for one of the doubletrees a whiffletree 28, connected at an intermediate point with the right hand lever of the flexible evener by links 29 and equipped at its inner end with a swingletree 30 and having a doubletree 31 pivotally connected to its outer end. The swingletree 30 is pivoted to the whiffletree 28 at the lower face thereof, and the doubletree 31, which may be of any preferred construction, is shown in Fig. 6 as consisting of a metallic bar pivoted to the upper face of the whiffletree by a bolt 32 and having angularly bent inner and outer arms carrying swingletrees 33 and 34. The swingletree 33 is located above the inner arm of the doubletree 31, and the other swingletree 34 is arranged beneath the outer arm of the doubletree 31 and below the plane of the whiffletree 28. Any other form of doubletree may, of course, be employed, but with the construction shown the central swingletree 33 is located above the whiffletree, while the end swingletrees 30 and 34 are located below the whiffletree.

What is claimed is:—

In a draft equalizer, the combination with a clevis, of two overlapped levers, one of the levers consisting of a single bar and the other lever being composed of two bars spaced apart and arranged above and below the single bar, the upper and lower bars being pivoted at their inner ends to the single bar lever at a point intermediate of the ends thereof, an ear projecting from the inner end of the single bar lever, spaced ears extending forwardly from the front edges of the upper and lower bars at a point between the ends thereof, a main longitudinal bar secured at its rear end to the clevis and pivoted at its front end to the ear of the single bar lever, an angularly disposed brace arranged at one side of the main bar and secured to the same and to the clevis, and angularly disposed loop-shaped links located at the opposite side of the main bar and pivoted at their rear ends to the same in advance of the clevis, said links being located above and below the single bar lever and composed of bars arranged in pairs and embracing the upper and lower bars of the other lever and provided at their front terminals with connecting pivots which pass through the said spaced ears.

In testimony that I claim the foregoing as my own, I have hereto affixed my signature in the presence of two witnesses.

JOHN GROSS.

Witnesses:
O. M. GROSS,
O. A. DENTLINGER.

Copies of this patent may be obtained for five cents each, by addressing the "Commissioner of Patents, Washington, D. C."